United States Patent
Hermann et al.

(10) Patent No.: US 7,248,485 B2
(45) Date of Patent: Jul. 24, 2007

(54) CIRCUIT ARRANGEMENT WITH POWER FACTOR CORRECTION AS WELL AS A CORRESPONDING APPLIANCE

(75) Inventors: Wolfgang Hermann, Tennenbronn (DE); Michael Meitzner, Villingen-Schwenningen (DE); Jean-Paul Louvel, Brigachtal (DE)

(73) Assignee: Thomson Licensing, Boulogne-Billancourt (FR)

( * ) Notice: Subject to any disclaimer, the term of this patent is extended or adjusted under 35 U.S.C. 154(b) by 385 days.

(21) Appl. No.: 10/499,233

(22) PCT Filed: Dec. 5, 2002

(86) PCT No.: PCT/EP02/13782

§ 371 (c)(1),
(2), (4) Date: Jun. 17, 2004

(87) PCT Pub. No.: WO03/052908

PCT Pub. Date: Jun. 26, 2003

(65) Prior Publication Data

US 2005/0116694 A1 Jun. 2, 2005

(30) Foreign Application Priority Data

Dec. 17, 2001 (DE) ................. 101 62 048

(51) Int. Cl.
*H02M 3/335* (2006.01)
(52) U.S. Cl. ............... 363/20; 363/37; 363/89
(58) Field of Classification Search ............... 363/21.1, 363/34–41, 89, 97, 98, 65–71, 49; 361/149–151, 361/267

See application file for complete search history.

(56) References Cited

U.S. PATENT DOCUMENTS

| 4,855,890 A | 8/1989 | Kammiller |
| 6,069,800 A * | 5/2000 | Cross et al. ................. 363/20 |
| 6,330,175 B2 * | 12/2001 | Shirato et al. ............... 363/89 |

FOREIGN PATENT DOCUMENTS

| EP | 913915 | 5/1999 |
| EP | 1122872 | 8/2001 |

OTHER PUBLICATIONS

Search Report Dated Oct. 1, 2003.

* cited by examiner

*Primary Examiner*—Rajnikant B. Patel
(74) *Attorney, Agent, or Firm*—Joseph J. Laks; Harvey D. Fried; Sammy S. Henig

(57) ABSTRACT

The circuit arrangement has a mains connection, a mains switch and a switched-mode power supply which contains a power factor coil for power factor correction. In this case, the mains switch has two switching contacts, one of which is arranged in a supply line between the mains connection and the switched-mode power supply, and in this way switches the phase or neutral conductor of the 50 Hz line network off and on. The connections of the second switching contact are located in a voltage supply for the driver circuit of the switched-mode power supply, and the second switching contact switches the switching transistor in the switched-mode power supply off when the circuit arrangement is switched off, by its control voltage being switched off directly or indirectly. The switching contact of a relay is arranged in parallel with the first switching contact of the mains switch, and the control coil of this relay is connected to an output voltage of the switched-mode power supply. Since the output voltages of the switched-mode power supply are each buffered by a capacitor, the relay is thus still open for a certain time after the arrangement has been switched off. The energy which is stored in the power factor coil is thus dissipated by the relay, by the coil drawing the current which is required to dissipate the energy from the mains via the relay.

10 Claims, 2 Drawing Sheets

CIRCUIT ARRANGEMENT WITH POWER FACTOR CORRECTION AS WELL AS A CORRESPONDING APPLIANCE

This application claims the benefit, under 35 U.S.C. § 365 of International Application PCT/EP02/13782, filed Dec. 5, 2002, which was published in accordance with PCT Article 21(2) on Jun. 26, 2003 in English and which claims the benefit of German patent application No. 10162048.9, filed Dec. 17, 2001.

The present invention is based on a circuit arrangement having a mains connection, a mains switch with two switching contacts, a switching element, a power factor coil for power factor correction, and a switched-mode power supply and on an appliance having a corresponding circuit arrangement.

Switched-mode power supplies produce a highly pulsed load on the mains power supply system, and this leads to harmonic currents in the mains power supply system. This load occurs in the region of the voltage maxima of the sinusoidal mains voltage, at which maxima an energy-storage capacitor in the switched-mode power supply is recharged. Appliances having a relatively high power consumption, such as television sets with relatively large cathode ray tubes, must therefore now comply with specific regulations with regard to harmonic currents. The harmonic load on the mains power supply system caused by an appliance can in this case be indicated by a so-called power factor.

Widely differing circuit concepts are known for improving the power factor, for example those disclosed in DE-A-196 10 762, EP-A-0 700 145 and U.S. Pat. No. 5,986,898. These contain a second current path with a coil between the mains rectifier and the primary winding of the transformer, with the inductance of this coil acting like a current pump, which is controlled by the switching transistor and in this way broadens the pulsed current flow in the switched-mode power supply.

A further possible way to improve the power factor of a switched-mode power supply is to use a coil in the input area of the switched-mode power supply. This coil is also called a 50 Hz coil, mains frequency coil or power factor coil. In order to avoid confusion with other coils, the description therefore always uses the term power factor coil for this coil. However, this power factor coil has the disadvantage that, when the mains switch is operated in order to switch off the appliance, the current flow in the power factor coil is interrupted suddenly. The energy stored in the coil must, however, be dissipated. Since the open means switch represents the highest impedance of the circuit, a very high voltage is therefore developed across the switching contacts of the mains switch, and this causes an arc. This means that the mains switch ages more quickly, and that the switch represents a safety risk since, in the worst case, it is a potential source of fire.

Other mains switches in which the rate of opening of the switching contacts is low are likewise at risk. In this case, although the voltage across the contacts is not very high, an arc is nevertheless produced and burns until the end of the corresponding mains half-cycle. This also results in a large amount of energy being lost in the switch, which leads to rapid ageing.

The object of the present invention is to specify a circuit arrangement as well as a corresponding appliance of the type mentioned initially, which have high reliability with circuit complexity that is as economic as possible.

The circuit arrangement according to the invention has a mains connection, a mains switch and a switched-mode power supply, which contains a power factor coil for power factor correction. The mains switch in this case has two switching contacts, one of which is arranged in a supply line between the mains connection and the switched-mode power supply and the switched-mode power supply, and in this way switches the phase or neutral conductor of the 50 Hz line network off and on. The second switching contact is arranged in the voltage supply for the driver circuit of the switched-mode power supply and switches the switching transistor in the switched-mode power supply off when the circuit arrangement is switched off, by switching off a control or supply voltage.

The switching contact of a relay is arranged in parallel with the first switching contact of the mains switch, the control coil of which relay is connected to an output voltage of the switched-mode power supply. Since the output voltages of the switched-mode power supply are each buffered by a capacitor, the relay is thus still closed for a certain time after the arrangement has been switched off. The energy stored in the power factor coil is thus dissipated via the relay by the coil drawing the current which is required to dissipate the energy from the mains via the relay. The relay does not open until the output voltage which is present across the relay has fallen, so that the current flow from the mains connection is interrupted completely.

The invention will be explained in more detail in the following text by way of example using an exemplary embodiment which is illustrated schematically in the figures, in which.

Figure 1:
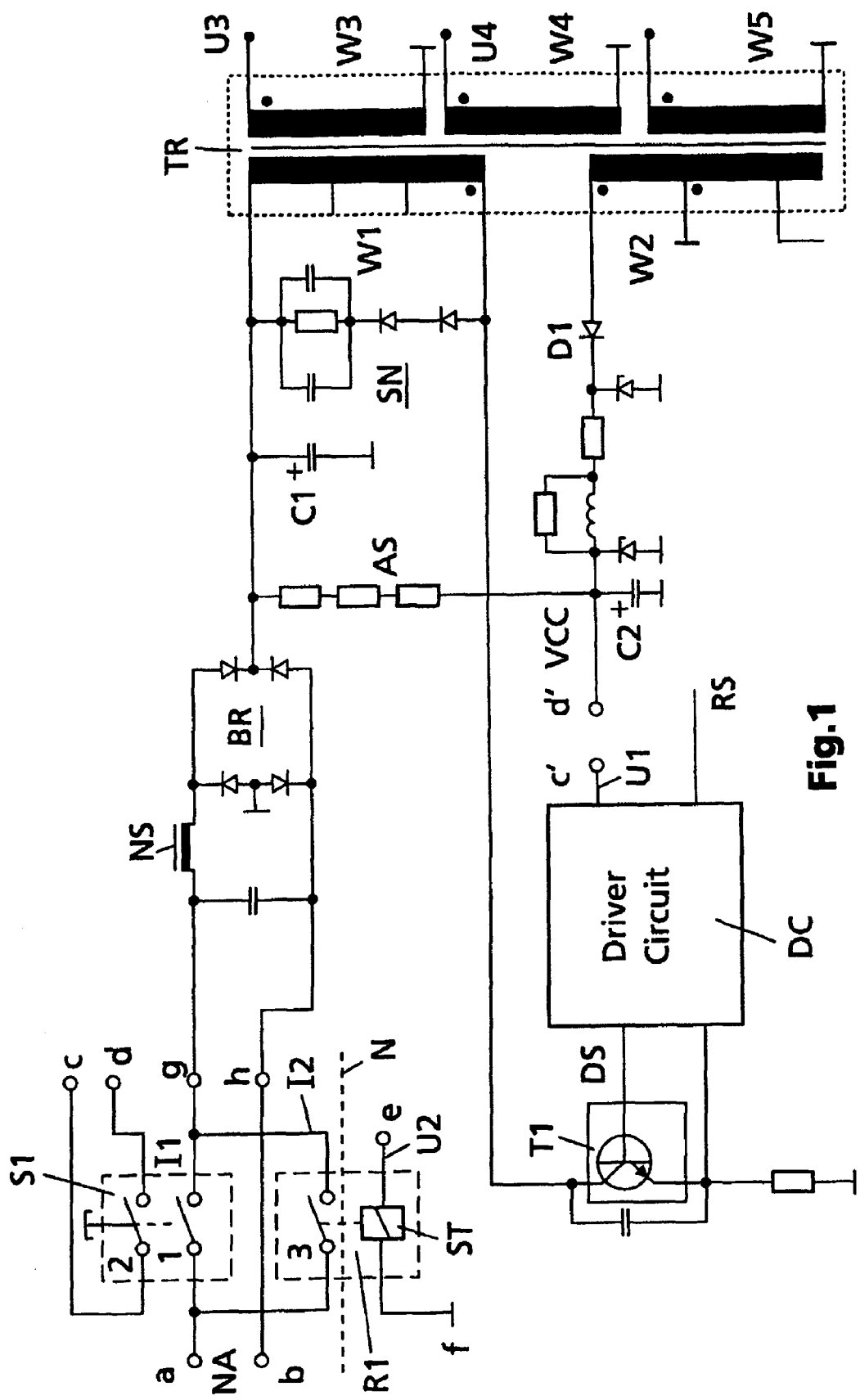
FIG. 1 shows an arrangement with a mains switch, a relay and a switched-mode power supply.

FIG. 1 shows, schematically, a switched-mode power supply which has a rectifier means, in this example a bridge rectifier BR with four diodes, an energy-storage capacitor C1 and a transformer TR with a primary winding W1, an auxiliary winding W2 arranged on the primary side as well as secondary windings W3, W4 and W5 arranged on the secondary side. The energy-storage capacitor C1 is in this case arranged between the bridge rectifier BR and the primary winding W1. A switching transistor T1, which is controlled by a control voltage DS from a driver circuit DC, is connected in series with the primary winding W1. A supply voltage VCC, for operating the switched-mode power supply is supplied to the driver circuit DC, and is produced via the auxiliary winding W2, a diode D1 and a capacitor C2.

The switched-mode power supply in FIG. 1 is a part of a circuit arrangement which, in addition to a mains connection NA and a mains switch S1, has two switching contacts 1, 2. The circuit arrangement is, for example, integrated in a television set.

In order to control the switched-mode power supply, the driver circuit DC is supplied with a control signal RS, which is derived from a supply voltage U4 on the secondary side, for example the system voltage in a television set, and is transmitted via an optocoupler or an isolating transformer, which is not illustrated, to the primary side of the switched-mode power supply. The so-called snubber network SN is arranged in parallel with the primary winding W1 and is used to damp voltage spikes which occur when the switching transistor T1 is switched off.

The switched-mode power supply also contains a starting circuit AS, which supplies the driver stage DC (after the appliance in which the circuit arrangement is integrated has been switched on) with power for the starting phase of the switched-mode power supply. The starting circuit AS is normally a high-impedance resistor chain, which produces a connection between the bridge rectifier BR and the capacitor C2 in order to produce the supply voltage VCC. During operation, the supply voltage VCC is then produced by the auxiliary winding W2, as well as the diode D1 and the filter capacitor C2.

The switched-mode power supply as shown in FIG. 1 preferably operates on the flyback converter principle, although other circuit principles are likewise possible. Flyback converters are preferably used in appliances for entertainment electronics, for example in television sets and video recorders. In this case, when the switching transistor T1 in a flyback converter is switched on, energy is stored in the transformer TR and is then transmitted, in the phase when the switching transistor is switched off, to the secondary windings W3-W5, and to the primary auxiliary winding W2. Flyback converters are used both as AC/DC converters and as DC/DC converters.

Switched-mode power supplies of this type have a low power factor, since the energy-storage capacitor C1 is recharged only in the area of the voltage maxima and minima of the 50 Hz mains voltage, when the output voltage from the bridge rectifier BR is greater than the voltage value across the energy-storage capacitor C1. One simple possibility for improving the power factor of a switched-mode power supply is to use a mains frequency coil or power factor coil NS, which is connected between the mains connection NA and the energy-storage capacitor C1. In this exemplary embodiment, it is connected between the mains switch S1 and the mains rectifier BR.

This coil broadens and shifts the phase of the pulsed current flow which is used to recharge the energy-storage capacitor C1, since the inductance of the power factor coil NS, for example 50 mH, causes the current flow through the coil to rise only gradually, and to fall once again in a damped manner. Appropriate choice of the inductance value in this case achieves a power factor that complies with the requirements.

Since the power factor coil NS is arranged in the current path of the mains switch S1, the relatively high inductance of the power factor coil NS causes a high voltage when the switching contact 1 is opened, and this leads to an arc in the switching contact 1. The mains switch S1 has two switching contacts 1 and 2, of which, according to the invention, a first switching contact 1 is connected in a supply to the mains connection NA, and the second switching contact 2 is coupled to a supply or control voltage for the driver circuit DC. The second connection b of the mains connection NA is connected to the bridge rectifier BR without being switched.

The second switching contact 2 is in this way used for switching off the switching transistor T1, by using the driver circuit to switch off the switching voltage DS for the switching transistor T1 directly or indirectly. The switching contact 2 may, for example, be connected between the connecting points c' and d', so that the driver circuit DC is disconnected from the supply voltage VCC during the switching-off process. The switching transistor T1 is then switched off completely after only a few switching cycles.

A capacitor (not shown) is advantageously also connected to earth downstream from the connection c' and is used to prevent the switching contact 2 of the switch from bouncing, and also to provide filtering for the long supply line to the mains switch S1. In this case, the capacitors of the capacitor also influences the number of switching cycles after which the switching transistor T1 is switched off completely.

However, another voltage, for example a control voltage for the driver circuit DC can also be switched off in a corresponding manner by the switching contact 2, or the switching contact 2 can be used to ensure that the control signal RS is at a predetermined voltage value, so that the switching transistor T1 is likewise switched off permanently.

A bypass is arranged in parallel with the switching contact 1 of the mains switch S1, and bridges this switching contact. This is advantageously a relay R1 with mains isolation, although other switching elements, for example a switching transistor, may also be used. When a relay R1 is used for mains isolation, an output voltage U2 on the secondary side can be applied directly to the control coil ST of the relay 1, at the connection e. The mains isolation is in this case indicated by a line N in FIG. 1.

When the mains switch S1 is opened, the switching contact 2 thus switches off the switching transistor T1 directly or indirectly in a short time, so that no more energy is transferred from the transformer TR to the secondary windings W2-W5. However, a current can still flow through the bypass, the switching contact 3 of the relay R1, so that the magnetic field in the power factor coil NS can be dissipated by means of a current flow via the relay R1 without any arc being formed across the switching contact 1 of the mains switch S1. This considerably improves the life of the mains switch S1.

The output voltage U2 is, for example, a rectified and smoothed voltage, which is obtained from the supply voltage U3 by means of a diode and a relatively large filter capacitor (which is not illustrated). The switching contact 3 of the relay R1 thus opens with a delay in comparison to the switching contacts 1 and 2, since the larger capacitor discharges with a considerable delay with respect to a switching cycle of the switching transistor. The time constant is in this case dependent on the capacitance of this capacitor and on the burden produced by the load. The connection a of the mains connection NA is not completely disconnected from the switched-mode power supply until after this.

When the appliance is switched on by pressing the mains switch S1, the switching contacts 1 and 2 are closed, so that the switched-mode power supply can start via the switching contact 1 since, at the same time, the driver circuit DC is once again ready to operate via the switching contact 2. Once the switched-mode power supply has started up, then the switching contact 3 of the relay R1 is also closed again by the output voltage U2, so that the appliance can then be switched off again without any arc in the mains switch S1. During switching on, the switched-mode power supply thus behaves in precisely the same way as when using the mains switch S1 in appliances of a conventional type.

The appliance in which the switched-mode power supply is arranged has a normal mode and a standby mode, also referred to as a readiness mode, then it is advantageous to use as the voltage U2 an output voltage which is produced on the secondary side and is switched off in the standby mode. The relay is then switched off in the standby mode, and does not consume any energy. The switching contact 3 is then opened. However, there is no disadvantage in switching off the appliance when it is in the standby mode since, in the standby mode, the power consumption of the appliance is so low that no arc can be formed across the switching contact 1 of the mains switch.

Figure 2:
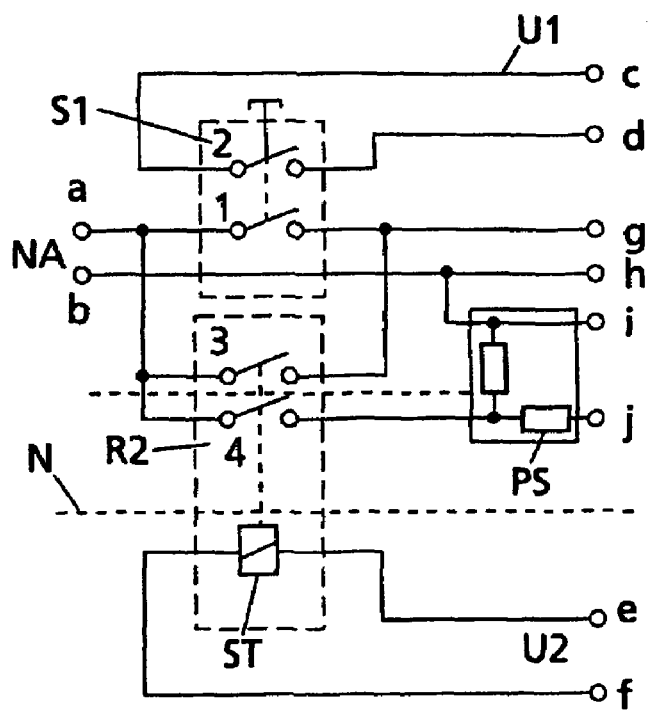
FIG. 2 shows an arrangement with a relay, which has an additional switching contact for a demagnetization coil.

FIG. 2 shows a mains switch S1 with two switching contacts 1 and 2, which are connected as described in FIG. 1. However, a relay R2 is used as the relay here, having a second switching contact 4, in parallel with the switching contact 3. The switching contact 4 is in this case advantageously used for driving a demagnetization coil (which is not illustrated), which is normally used in television sets with a cathode ray tube or in corresponding computer monitors. The drive for the control coil ST of the relay R2 in this case corresponds to the drive for the relay R1 in FIG. 1. The relay R2 likewise has mains isolation, indicated by the line N. The same reference symbols are in this case used for further connections and elements in FIG. 2 which correspond to the equivalent connections and elements in FIG. 1.

Cathode ray tubes, which are used in television sets or computer monitors, require demagnetization from time to time, in order to maintain the colour purity of the cathode ray tube. This is achieved by means of a demagnetization coil, to which an AC voltage is normally applied during the process of switching on the appliance. The 220 volt means voltage is used as the AC voltage in this case and produces a large current surge at the time of switching on, which then gradually decays. The decay is produced by means of a so-called posistor PS, which is heated by the high current, with its impedance becoming high in the process.

Once the current surge has decayed, the posistor PS subsequently consumes about 1 watt of power, however, since it is permanently heated. This is not good for the standby mode of an appliance, since the standby consumption, for example for television sets, is intended to be as low as possible. A relay is thus frequently used to switch off the demagnetization coil in the standby mode.

In one development of the invention, one connection of the posistor PS is now connected to the second switching contact 4 of the relay R2, and a second connection of the posistor PS is connected to the connection b of the mains connection NA. The demagnetization coil (which is not illustrated) is connected to the connections i, j. A secondary voltage is used as the control voltage U2 and is switched off in the standby mode, so that the demagnetization coil is likewise switched off by the switching contact 4 in the standby mode. This saves the relay for switching off the demagnetization coil, and the corresponding drive for the relay.

The voltage U2 may therefore be present only in the normal mode, and it must be available before the start of the deflection process in the cathode ray tube in order to avoid image disturbances caused by the demagnetization process. However, an appropriate voltage is already available in a television set, so that the relay R2 therefore not only makes it possible to avoid wear resulting from arc effects in the mains switch, but also means that the demagnetization coil is switched off in the standby mode.

Figure 3:
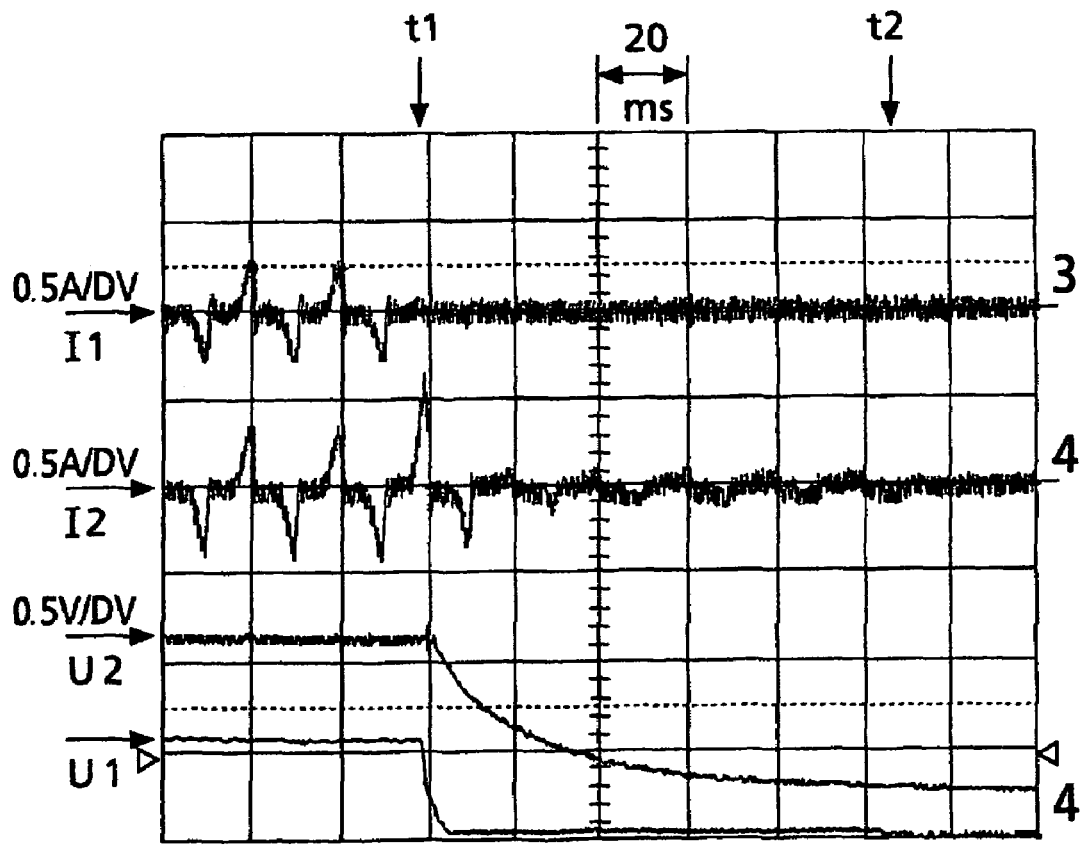
FIG. 3 shows a current and voltage diagram of the circuit arrangements at the time of switching off.

The operation of the circuit as illustrated in FIG. 1 will now be explained in more detail using the current and voltage diagrams shown in FIG. 3. I1 is in this case the current flying through the switching contact 1 of the mains switch S1, and I2 is the current flowing through the switching contact 3 of the relay R1. U1 is the voltage applied to the connection c' of the driver circuit DC and U2 is the secondary voltage applied to the connections e and f.

Until the time t1, the switched-mode power supply is operated in the normal mode. This clearly shows the 50 Hz current pulses in the current I1 and I2 when the energy-storage capacitor C1 is recharged, damped by the power factor correction coil NS. The currents I1 and I2 are in this case of equal magnitude, since the current is shared by the mains switch S1 and the relay R1.

The mains switch S1 is now operated, and the appliance is thus switched off, at the time t1. The voltage U1, the supply voltage for the driver circuit DC in consequence falls immediately. The current flow I1 through the switching contact 1 is likewise interrupted immediately. Twice the current I2 now flows through the switching contact 3 of the relay R1, since the capacitor C1 is once again completely recharged. As the process continues, the current I2 decays, however, by which means the magnetic field in the correction coil NS is also dissipated.

However, the voltage U2 falls only gradually after the time t1, since the filter capacitor for the secondary voltage U2 is discharged only gradually. The contact 3 of the relay R1 does not open until the time t2, when the voltage U2 has fallen below a specific threshold value, so that the connection a of the mains connection NA is completely isolated from the mains after this time. The time t2 in this case occurs approximately 100 milliseconds after the time t1, so that no arc is now produced either across the switching contacts 1 or across the switching contacts 3 of the relay R1. No more current flow through the relay R1 can be seen at the time t2.

Further refinements of the invention are within the capability of a person skilled in the art. In particular, other suitable switching means, such as transistors, may also be used as relays. A supply voltage which is produced by the high-voltage transformer in an appropriate appliance can also be used as the control voltage U2 for the relay R1 or R2. If a number of switched-mode power supplies are used in the arrangement, for example a first switched-mode power supply for the normal mode and a second switched-mode power supply for the standby mode, then it is sufficient to switch the first switched-mode power supply off using the switching contact 2, since the power consumption of the standby switched-mode power supply can be ignored. The invention is likewise not restricted to flyback converters, as already explained above, and can also be used for other switched-mode power supply concepts when power factor correction is required.

The invention claimed is:

1. Circuit arrangement having a mains connection, a mains switch comprising two switching contacts, a switching element, and a switched-mode power supply, which has
   a transformer with a primary winding,
   a rectifier means providing a rectified voltage for said primary winding,
   an energy-storage capacitor coupled with a terminal to said rectifier means and said primary winding,
   a switching transistor coupled to said primary winding, a driver circuit for producing a control voltage for said switching transistor, and
   a power factor coil for power factor correction coupled between said mains connection and said energy-storage capacitor, wherein a first of said switching contacts is arranged between said mains connection and said rectifier means,
   the second of said switching contacts is coupled to a supply or control voltage for said driver circuit in order to switch off said control voltage for said switching transistor, and
   a switching contact of said switching element is arranged in parallel with said first switching contact of said mains switch for maintaining a current after said circuit arrangement is switched off by means of said mains switch.

2. Circuit arrangement according to claim 1, wherein said transformer has an auxiliary winding for producing a supply voltage for said driver circuit, and wherein said second switching contact is arranged between said auxiliary winding and said driver circuit in order to switch off said supply voltage.

3. Circuit arrangement according to claim 2, wherein a diode as well as a capacitor for producing said supply voltage are arranged at one connection of said auxiliary winding, and wherein said second switching contact is arranged between said capacitor and said driver circuit.

4. Circuit arrangement according to claim 1, wherein said switching element is a relay.

5. Circuit arrangement according to claim 4, wherein a rectified and filtered output voltage from said switched-mode power supply is applied to one connection of a control coil of said relay, such that said switching contact of said relay opens if the output voltage falls, and in that, when said arrangement is switched off, the supply voltage or control voltage falls more quickly than the output voltage of said switched-mode power supply.

6. Circuit arrangement according to claim 5, wherein said switched-mode mode power supply has a normal mode and a standby mode, in that said output voltage is produced by a winding arranged on the secondary side, and in that said output voltage is switched off in said standby mode.

7. Circuit arrangement according to claim 6, wherein said relay has a second switching contact, which is arranged between said mains connection and a demagnetization coil so that said demagnetization coil is switched off in said standby mode.

8. Circuit arrangement according to claim 1, wherein said power factor coil is arranged between said first switching contact and said rectifier means.

9. Appliance, wherein said appliance has a circuit arrangement having a mains connection, a switching element, a mains switch which has two switching contacts, and a switched-mode power supply, which has a transformer with a primary winding, a rectifier means providing a rectified voltage for said primary winding, an energy-storage capacitor coupled to said rectifier means and said primary winding, a switching transistor coupled to said primary winding, a driver circuit for producing a control voltage for said switching transistor, and a first of said switching contacts is arranged between said mains connection and said rectifier means, a power factor coil for power factor correction coupled between said mains connection and said energy-storage capacitor, wherein the second of said switching contacts is coupled to a supply or control voltage for said driver circuit in order to switch off said control voltage for said switching transistor, and a switching contact of said switching element is arranged in parallel with said first switching contact of said mains switch for maintaining a current after said circuit arrangement is switched off by means of said mains switch.

10. Appliance according to claim 9, wherein said appliance has a cathode ray tube with a demagnetization coil.

* * * * *

UNITED STATES PATENT AND TRADEMARK OFFICE
CERTIFICATE OF CORRECTION

PATENT NO.         : 7,248,485 B2
APPLICATION NO. : 10/499233
DATED              : July 24, 2007
INVENTOR(S)       : Wolfgang Hermann, Michael Meitzner and Jean-Paul Louvel It is certified that error appears in the above-identified patent and that said Letters Patent is hereby corrected as shown below:

Lines 63 through 67 under column 1 starts with "The object of the present..." and ends with "economic as possible" should be deleted.

Signed and Sealed this

Fourth Day of November, 2008

JON W. DUDAS
*Director of the United States Patent and Trademark Office*